United States Patent
Scott

(10) Patent No.: US 10,280,033 B2
(45) Date of Patent: May 7, 2019

(54) DISPENSING FROM AN APPARATUS

(71) Applicant: The United States of America, as represented by the Secretary of the Army, Washington, DC (US)

(72) Inventor: Jeremy David Scott, Aberdeen, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 444 days.

(21) Appl. No.: 15/008,532

(22) Filed: Jan. 28, 2016

(65) Prior Publication Data

US 2017/0217715 A1 Aug. 3, 2017

(51) Int. Cl.
| | |
|---|---|
| *B65H 51/30* | (2006.01) |
| *B65H 75/42* | (2006.01) |
| *H02G 11/02* | (2006.01) |
| *B65H 75/44* | (2006.01) |

(52) U.S. Cl.
CPC .......... *B65H 51/30* (2013.01); *B65H 75/425* (2013.01); *B65H 75/4484* (2013.01); *H02G 11/02* (2013.01)

(58) Field of Classification Search
CPC ..... B65H 51/30; B65H 75/4484; H02G 11/02
See application file for complete search history.

(56) References Cited

U.S. PATENT DOCUMENTS

| | | | |
|---|---|---|---|
| 4,015,795 A | 4/1977 | Chong | |
| 4,154,324 A | 5/1979 | Upton et al. | |
| 4,185,550 A | 1/1980 | Vogt et al. | |
| 4,189,703 A | 2/1980 | Bennett | |
| RE30,727 E | 9/1981 | Chong | |
| 4,489,902 A * | 12/1984 | Chaconas | H02G 11/02 191/12.2 R |
| 4,667,897 A | 5/1987 | Burrow et al. | |
| RE34,376 E | 9/1993 | Branback | |
| 5,304,804 A | 4/1994 | Holt | |
| 5,678,785 A | 10/1997 | Porter | |
| 6,119,837 A * | 9/2000 | Tschurbanoff | B65H 75/425 191/12.2 A |
| 6,343,693 B1 | 2/2002 | Finley | |
| 6,353,993 B1 | 3/2002 | Schrader | |
| 6,935,040 B2 | 8/2005 | Alrutz et al. | |
| 7,331,436 B1 | 2/2008 | Pack et al. | |
| 7,530,523 B1 | 5/2009 | Murray | |
| 7,546,912 B1 | 6/2009 | Pack et al. | |
| 7,997,521 B1 | 8/2011 | Henson | |
| 8,042,663 B1 | 10/2011 | Pack et al. | |
| 8,201,769 B2 | 6/2012 | Agullo | |
| 8,332,106 B2 * | 12/2012 | Yuet | B65H 75/425 701/50 |
| 8,485,330 B2 | 7/2013 | Pack et al. | |
| 2003/0113092 A1 | 6/2003 | Porter | |
| 2003/0221914 A1 | 12/2003 | Smith et al. | |

(Continued)

*Primary Examiner* — Zachary L Kuhfuss
(74) *Attorney, Agent, or Firm* — Ronald Krosky; Azza Jayaprakash

(57) ABSTRACT

Various embodiments are described that relate to dispensing from an apparatus. The apparatus can be a cable dispensing apparatus that is attached to a vehicle. As the vehicle travels, the apparatus can lay or retract cable. The rate of this laying or retracting can be based, at least in part, on a travel condition of the vehicle.

20 Claims, 10 Drawing Sheets

(56) References Cited

U.S. PATENT DOCUMENTS

| | | |
|---|---|---|
| 2004/0232271 A1 | 11/2004 | Alrutz et al. |
| 2005/0029500 A1 | 2/2005 | Wechsler |
| 2007/0018031 A1 | 1/2007 | Sycko |
| 2010/0236785 A1* | 9/2010 | Collis .................. B08B 9/0436 166/339 |
| 2013/0098940 A1 | 4/2013 | Bem et al. |
| 2015/0090175 A1 | 4/2015 | Mori et al. |
| 2016/0176676 A1* | 6/2016 | Tsukui .................. B65H 75/42 242/390.9 |

* cited by examiner

DISPENSING FROM AN APPARATUS

GOVERNMENT INTEREST

The innovation described herein may be manufactured, used, imported, sold, and licensed by or for the Government of the United States of America without the payment of any royalty thereon or therefor.

BACKGROUND

Communication between devices, and in turn between people that control those devices, is important in a wide variety of applications. Oftentimes wireless communication (without guided media) techniques are employed for communication between these devices. However, in some environments, wireless communication is difficult if not impossible while in others wireless communication is not desirable. In one example, wireless communication devices can use direct line of sight techniques, but in a mountain area direct line of sight can be difficult to achieve.

SUMMARY

In one embodiment, a system comprises a determination component and an operational component. The determination component can be configured to determine a rate of transfer for a dispensing apparatus based, at least in part, on a predictive motion data set that pertains to the dispensing apparatus. The operational component can be configured to cause the dispensing apparatus to dispense at the rate of transfer. The determination component, the operational component, or a combination thereof can be implemented, at least in part, by way of non-software.

In another embodiment, a system comprises a cable dispensing apparatus and a control component. The cable dispensing apparatus can dispense a cable at a rate while a vehicle upon which the cable dispensing apparatus is travelling. The control component can determine a rate of dispensing for the cable based, at least in part, on a travel characteristic set of the vehicle. The travel characteristic set can comprise a direction of the vehicle.

In one embodiment, a method is performed, at least in part, by a cable dispensing management component while travelling upon a vehicle. The method comprises obtaining a first value for a travel parameter of a vehicle directly from the vehicle. The method also comprises making a determination for a first dispensing rate for a cable dispensing device of the vehicle based, at least in part, on the first value. The method further comprises controlling the cable dispensing device to dispense at the first dispensing rate. In addition, the method comprises obtaining a second value for the travel parameter of the vehicle directly from the vehicle that is different from the first travel parameter after obtaining the first value. The method additionally comprises making a determination for a second dispensing rate for the cable dispensing device based, at least in part, on the second value after making the determination for the first dispensing rate. Further, the method comprises controlling the cable dispensing device to dispense at the second dispensing rate after controlling the cable dispensing device to dispense at the first dispensing rate.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
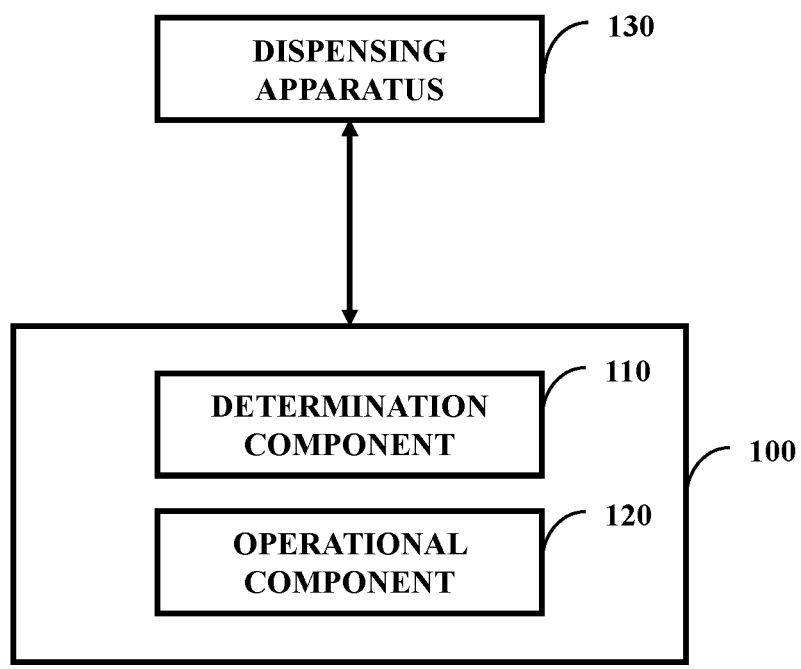
FIG. 1 illustrates one embodiment of a system comprising a determination component and an operational component.

While wireless communication can be beneficial, instances can occur where such communication is not reliable or not desirable. In one example, a combat environment can have communication occurring and the detection that such communication is occurring could be detrimental. In view of this, wireless communication can be less desirable and it can be more desirable to use wired communication. In order to use such wired communication, a cable upon which to communicate should be laid.

In order to lay this cable, a cable dispensing apparatus can be placed upon a vehicle. As the vehicle drives, the cable dispensing apparatus can dispense the cable. While in smooth and stable terrain this may be a relatively easy process, as terrain becomes more complicated laying cable can become more complex. In a smooth environment, cable can be laid at a constant rate. However, in a complex terrain, cable being laid at a constant rate can become problematic. As an example, when the vehicle changes speed the constant rate can lead to excess slack or undesired tension. As an example detriment, this tension can cause an undesired break in the cable.

Therefore, a proactive (e.g., automated) cable dispensing system can be used that changes a rate of dispensing based on contextual circumstances. In one example, as the vehicle increases speed, the cable dispensing system can lay cable more quickly so that there is less undesired tension. Similarly, if too much slack is identified (e.g., by way of visual sensors) the rate of dispensing can be slowed.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system comprising a determination component 110 and an operational component 120. The determination component 110 can be configured to determine a rate of transfer for a dispensing apparatus 130 based, at least in part, on a motion data set (e.g., a predictive motion data set) that pertains to the dispensing apparatus 130 (e.g., physical movement data of the dispensing apparatus 130 and/or cable movement/tension information of cable being dispensed by the dispensing apparatus 130). The operational component 120 can be configured to cause the dispensing apparatus 130 to dispense at the rate of transfer.

Figure 2:
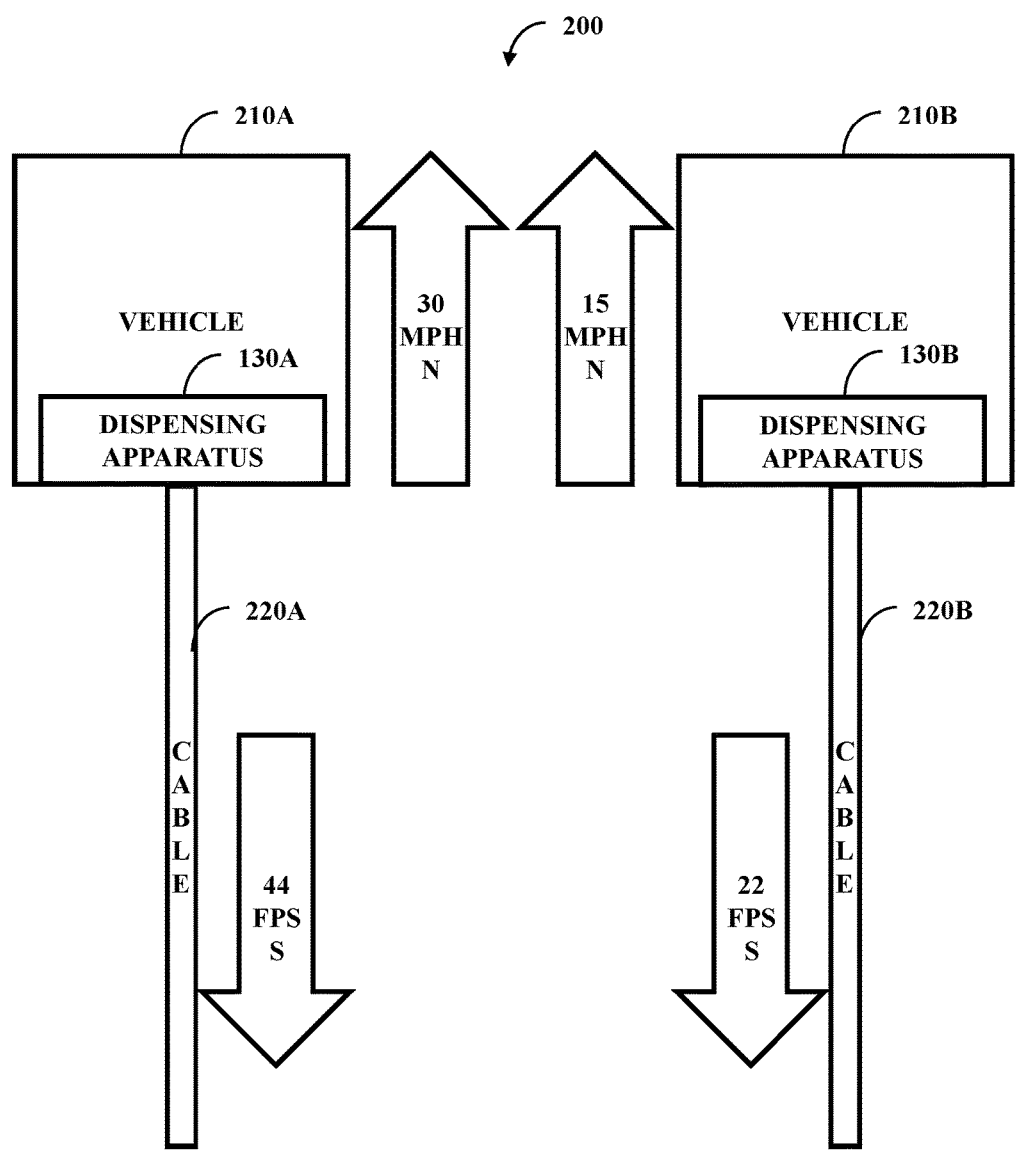
FIG. 2 illustrates one embodiment of an environment with two vehicles and two cables.

FIG. 2 illustrates one embodiment of an environment with two vehicles 210A and 210B (collectively referred to as vehicle 210) and two cables 220A and 220B (collectively referred to as cable 220). The vehicles 210A and 210B can have their own dispensing apparatus 130-130A for vehicle 210A and 130B for vehicle 130B.

The motion data set for the dispensing apparatus 130 can be travel information of the vehicle 210 upon which the dispensing apparatus 130 travels. In this, the dispensing apparatus 130 can be located upon the vehicle 210 and as the vehicle 210 travels the dispensing apparatus 130 can dispense the cable 220 (e.g., be unwound from a spool). Various travel information of the vehicle 210 can be used by the determination component 110 of FIG. 1 to determine the rate of transfer.

In one example, speed of the vehicle can be used, such as when the vehicle travels more quickly, the cable is dispensed more quickly. Vehicle 210A can travel at 30 miles per hour (mph) and in response to this the dispensing apparatus 130 can dispense the cable 220 at 44 feet per second (fps). Conversely, vehicle 210B can travel at 15 mph and in response to this the dispensing apparatus can dispense the cable 220 at 22 fps.

In another example, direction of the vehicle 210 can be used, such as that the dispensing apparatus 130 dispenses cable in an opposite direction upon which the vehicle 210 travels. The vehicle 210 can travel north and in response to this the dispensing apparatus 130 can dispense the cable 220 out the back of the vehicle 210. Depending on perspective this can be considered southwardly since the cable is going out the opposite end of which the vehicle 210 is travelling or northwardly since the cable continues unspooling in the same direction as the vehicle 210 is travelling (FIG. 2 illustrates this as southwardly).

While speed and direction are discussed as example travel information, other travel information can be used. In one example, ruggedness of terrain can be used as a determining factor in transfer rate. With this, the more rugged the terrain, the faster dispensing can occur so as to not experience breakage from an unexpected snag. This ruggedness can be determined based on information obtained, for example, by visual sensors viewing terrain, data transmitted from shock movement, or optical scanning of tires. These examples of travel information are not exclusive and non-discussed travel information can also be used.

Further, dispensing can be based on multiple types of travel information. In one example, direction (e.g., including rate of direction change), speed (e.g., including acceleration), and terrain ruggedness can be considered by the determination component 110 of FIG. 1. While FIG. 2 illustrates the rate of transfer for the cable 220 (e.g., a guided media) being proportional and responsive to the speed of the vehicle 210, aspects disclosed herein can be practiced without the proportionality.

Figure 3:
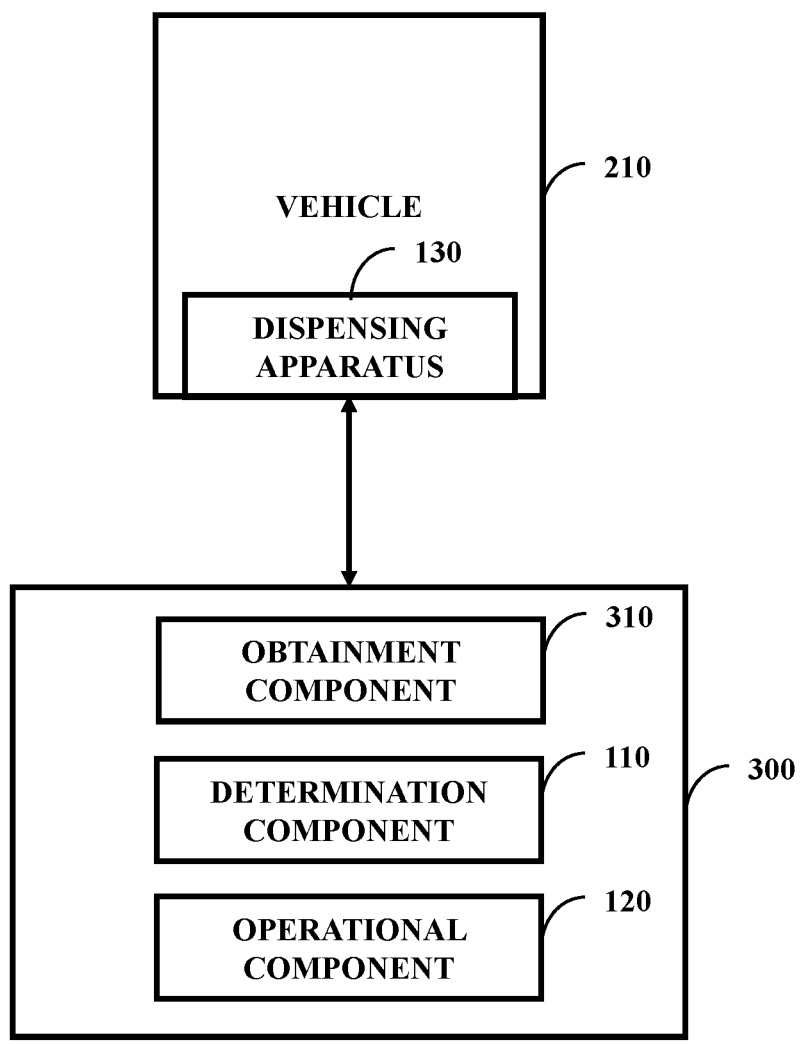
FIG. 3 illustrates one embodiment of a system comprising an obtainment component, the determination component, and the operational component.

FIG. 3 illustrates one embodiment of a system 300 comprising an obtainment component 310, the determination component 110, and the operational component 120. The obtainment component 310 can be configured to obtain the motion data set (e.g., one or more pieces of motion data). An example of the motion data set can be travel information from the vehicle 210. The obtainment component 310 can obtain the motion data set in a variety of manners.

In one example, the obtainment component 310 obtains the motion data set, at least in part, independent of the vehicle 210. As an illustration of this example, the obtainment component 310 can be part of the dispensing apparatus 130 and in turn travel upon the vehicle 210. The obtainment component 310 can comprise its own hardware, such as an accelerometer, to determine speed of the vehicle (e.g., since the dispensing apparatus 130 is on the vehicle 210, the speed of the vehicle 210 can also be the speed of the dispensing apparatus 130) or an optical sensor to sense tire rotations per minute. The output of this hardware can be accessed by the determination component 110 as the motion data set.

In one example, the obtainment component 310 obtains the motion data set, at least in part, from a vehicle data set gathered by the vehicle 210. As an illustration of this example, the vehicle 210 can have a speedometer and equipment to determine speed of the vehicle 210. The obtainment component 310 can access this information from the vehicle and supply the information to the determination component 310. This accessing can occur through a hard wire connection with the vehicle 210, such as with an onboard computer of the vehicle 210, or be wireless.

The obtainment component 310, the determination component 110, the operational component 120, another component disclosed herein, or a combination thereof can be, at least in part, located upon the vehicle 210 (e.g., be part of the vehicle 210), can be, at least in part, located upon the dispensing apparatus 130 (e.g., be part of the dispensing apparatus 130), be, at least in part, located elsewhere (e.g., on a mobile device), or a combination thereof. In one example, the system 300 (or the system 100 of FIG. 1) can be self-contained in the dispensing apparatus 130. The dispensing apparatus 130 can simply be placed on the vehicle 210 and operate in accordance with aspects disclosed herein without operational integration with the vehicle 210 and with the vehicle 210 being unaware of the presence of the dispensing apparatus 130. In one example, the system 300 can be part of the vehicle 210. The vehicle 210 can be a truck that is, at least in part, designed to lay cable and is fitted for integration with the dispensing apparatus 130. Other examples of the vehicle 210 can non-exhaustively include a car, motorcycle, plane, boat (e.g., a cable-laying ship), skateboard, bicycle, or scooter. In one example, the vehicle 210 can be a person and the system 300 is part of a device that is attached to a person that is rock-climbing and a safety rope is dispensed.

Dispensed can include distribution (e.g., laying) as well as retraction (e.g., retrieving). With this, the rate of transfer can be a rate of distribution and/or a rate of retraction. The system 300 can be configured to lay the cable 220 of FIG. 2 from a spool and return the cable 220 of FIG. 2 to the spool.

Figure 4:
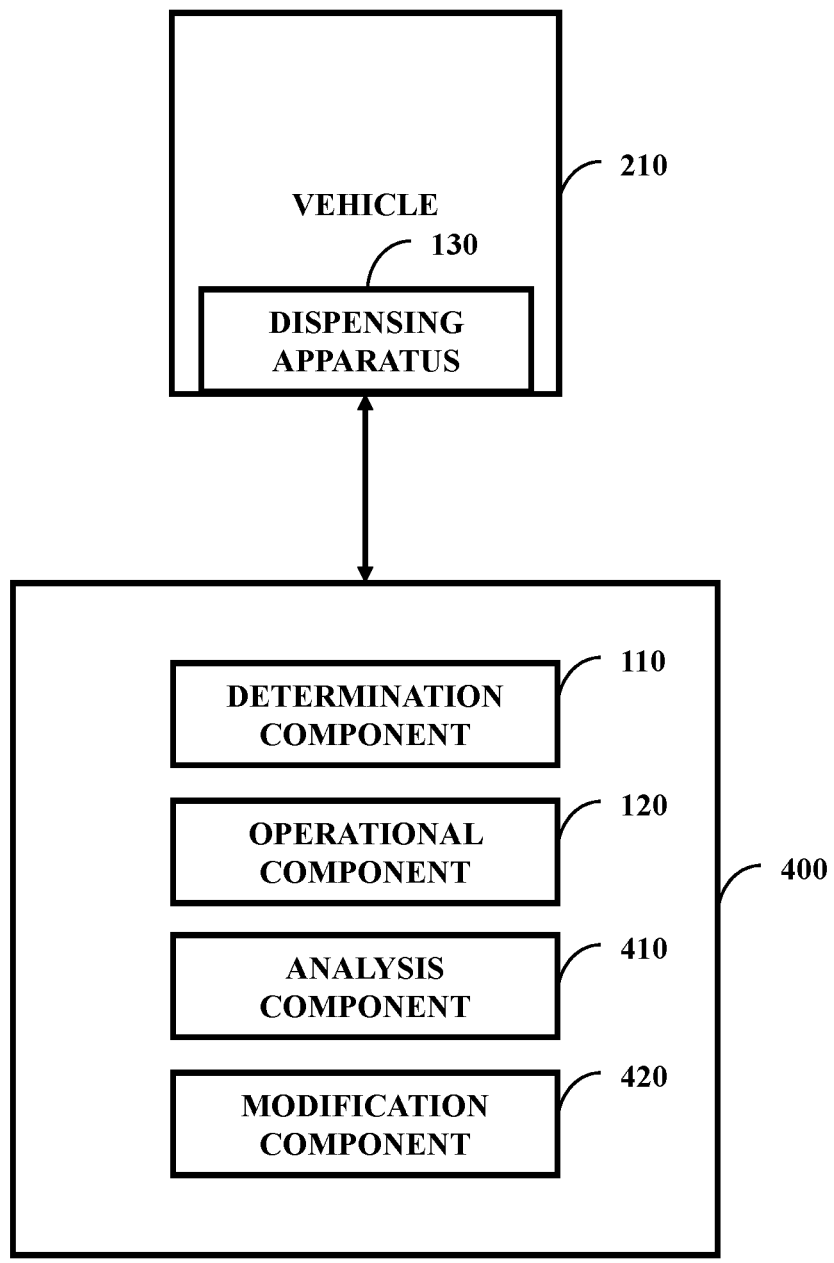
FIG. 4 illustrates one embodiment of a system comprising the determination component, the operational component, an analysis component, and a modification component.

FIG. 4 illustrates one embodiment of a system 400 comprising the determination component 110, the operational component 120, an analysis component 410, and a modification component 420. The analysis component 410 can be configured to analyze a success rate of the rate of transfer to produce an analysis result. The modification component 420 can be configured to modify the rate of transfer based, at least in part, on the analysis result.

The determination component 110 can retain internal logic used to calculate the rate of transfer based on various factors. However, specific nuances of a situation can cause the normal output from the determination component 110 to be less than ideal. In one example, while travelling over particularly rugged terrain the cable 220 of FIG. 2 can keep becoming stuck on rocks and in groves. This can cause extra tension on the cable 220 of FIG. 2 that is independent of the vehicle 210. This extra tension can be identified by the system 400 (e.g., the system 400 can include the obtainment component 310 of FIG. 3 to make such an identification). The analysis component 410 can analyze this added tension and have a result that the rate of transfer should be increased in order to reduce a chance of unintentional breakage. In response to this, the modification component 420 can increase the rate of transfer.

In one embodiment, the modification component 420 can be configured to modify the rate of transfer by terminating the transfer and severing a transferred article (e.g., the cable 220 of FIG. 2) from the dispensing apparatus 130. In one example, the cable 220 of FIG. 2 can become stuck and cause the vehicle 210 to be trapped. To free the vehicle 210 and/or to cause the vehicle 210 to not have a long piece of cable trailing after being stuck, the modification component 420 cause a severing the cable.

In other situations, the success rate can be identification that the cable 220 of FIG. 2 is successfully laid. The analysis component 410 can identify that a desired length of the cable 220 of FIG. 2 has been laid. In response to this the modification component 420 can cut the cable 220 of FIG. 2 so excess cable is not wastefully laid.

Figure 5:
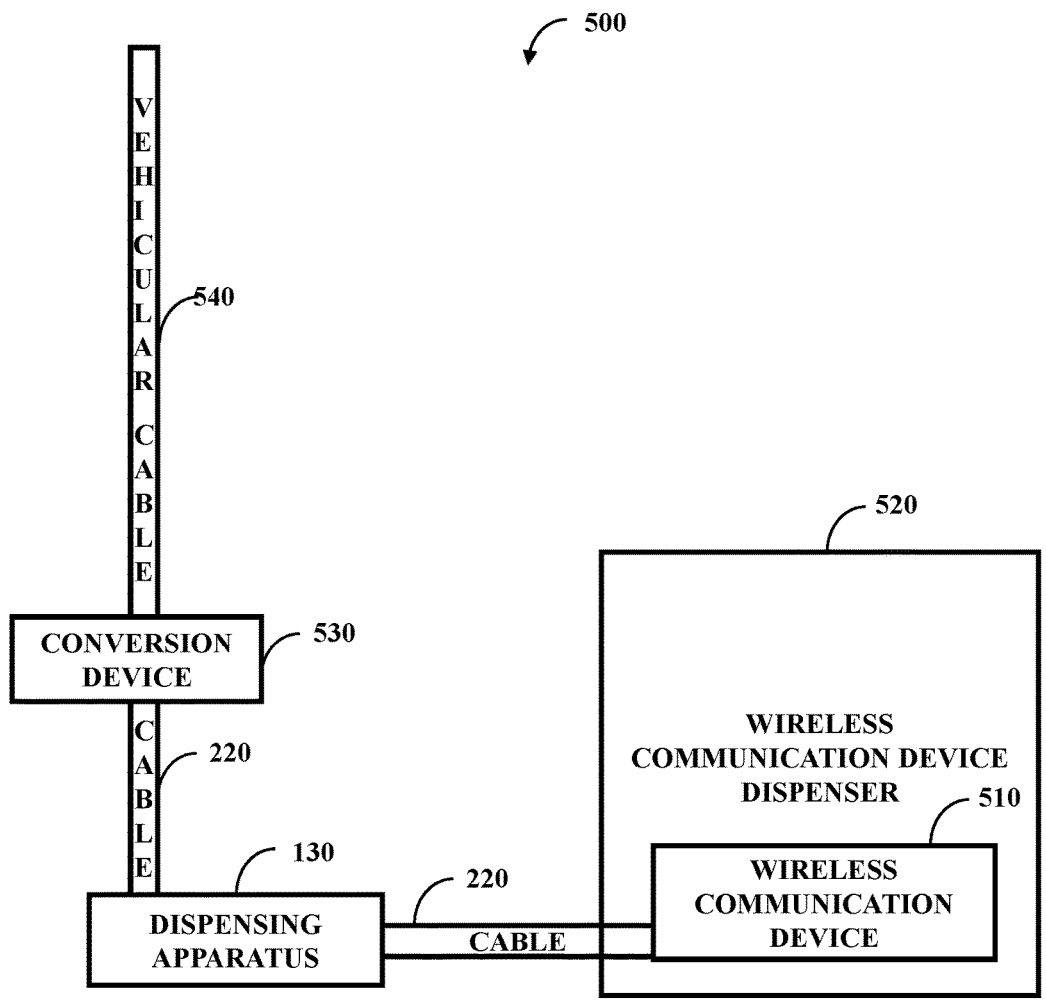
FIG. 5 illustrates one embodiment of a system comprising a dispensing apparatus, a wireless communication device, a wireless communication device dispenser, and a conversion device.

FIG. 5 illustrates one embodiment of a system comprising the dispensing apparatus 130, a wireless communication device 510, a wireless communication device dispenser 520, and a conversion device 530. The system 500 can be mounted to the vehicle 210 of FIG. 2 (e.g., a mobile platform). The system 500 can interactively connect to a computer network of the vehicle 210 of FIG. 2 by way of a vehicular cable 540 (e.g., Ethernet cable). The cable 220 can be dispensed by the dispensing apparatus at one end (e.g., a dispensed end) and also be affixed to the vehicle 210 of FIG. 2 at the other end (e.g., be operationally coupled to the vehicle 210 of FIG. 2). This affixing can take place, in one example, by way of the conversion device 520 that interfaces the cable 220 (e.g., a fiber optic cable) with the vehicular cable 540 and in turn the vehicle 210 of FIG. 2. The cable 220 of FIG. 2 can be used, for example, for data communication and/or electrical/electronic signaling.

The dispensing apparatus 130 (e.g., comprising a spool of fiber optic cable) can be coupled to wireless communication device 510 and in turn the wireless communication device dispenser. The dispenser 520 can dispense the communication device 510. The communication device 510 can function as an anchor for one end of the cable 220 (e.g., the dispensed end) while the other end can be coupled to the vehicle 210 of FIG. 2 as discussed above.

In one example, the communications device 510 can be deployed on the ground (e.g., deployed by the vehicle 210 of FIG. 2). A deployment component can identify a condition on when to deploy the communications device 510 and to start dispensing the cable 220. When this condition is identified, the deployment component can, in one example, cause a bottom door of the dispenser 520 to open such that the communications device 510 drops out and the cable 220 begins to be laid. Similarly, the deployment component can function to retrieve the communications device 510 when the cable 220 is retracted.

In one embodiment, when a spool comes to an end (e.g., there is no more cable 220 to be laid), a second communications device can be dispensed. When the spool is nearing its end, a notice can be given of this situation. In response to the notice, for example, the a reel of the dispensing apparatus 130 can be replaced, more cable 220 can be added to the reel, or as discussed above, the second communications device box can be dispensed.

Figure 6:
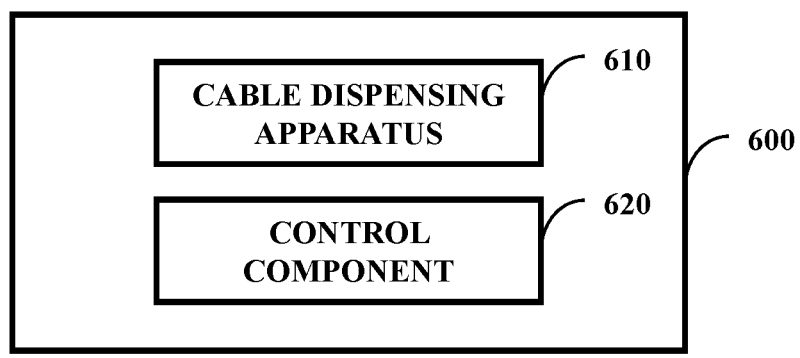
FIG. 6 illustrates one embodiment of a system comprising cable dispensing apparatus and a control component.

FIG. 6 illustrates one embodiment of a system comprising cable dispensing apparatus 610 and a control component 620. The cable dispensing apparatus 610 can dispense the cable 220 of FIG. 2. The control component 620 can be configured to determine a rate of dispensing for the cable 220 of FIG. 2 based, at least in part, on a travel characteristic set (one or more travel characteristic, such as direction) of the vehicle 210 of FIG. 2. The cable dispensing apparatus 610 can dispense the cable 220 of FIG. 2 at the rate of dispensing, such as while the vehicle 210 of FIG. 2 is travelling (e.g., the cable dispensing apparatus 610 on and/or part of the vehicle 210 of FIG. 2).

In one embodiment, the travel characteristic set comprises a speed of the vehicle and a direction of the vehicle 210 of FIG. 2. This can be actual speed and direction of the vehicle 210 of FIG. 2 or predicted speed and direction of the vehicle 210 of FIG. 2. In one example of predictive speed and direction, the vehicle can be an all-terrain vehicle (ATV). The ATV can be have a governor that maximizes speed to about ten mph. While the ATV accelerates, the control component 620 can predict that the ATV is accelerating to about ten mph. Therefore, while the ATV may at one point be at three mph, the control component 620 can dispense cable at a rate anticipating ten mph. In another example, there may be delay between reading the speed and direction and how the ATV actually performs (e.g., time from when speed is identified to when the speed is communicated to the control component 620). Therefore, the control component 620 can predict an actual speed to compensate for this delay. An example of another travel characteristic is path (e.g., route traveled by the vehicle 210 of FIG. 2)—actual or predictive.

In one example, a prediction can be made from revolutions per minute in an engine of the vehicle 210 of FIG. 2 (e.g., along with other information, for information pertaining to mechanics of the vehicle 210 of FIG. 2 such as a transmission gear shift that causes a change in the revolutions). In this, if the revolutions increase, the prediction can be that speed (e.g., resultant speed and/or acceleration) will soon increase. The cable 220 of FIG. 2 can be dispensed earlier in anticipation of this speed increase. This can lower dispensing speeds and therefore cause less overall degradation on the parts of the dispensing apparatus 130 (e.g., when the dispensing apparatus 130 is used multiple times and reloaded with different cables). Further, this can allow the dispensing apparatus 120 to be smaller, lighter, less powerful, and less expensive since a lower top dispensing rate can be used.

The rate of dispensing determined by the control component 620 can be an initial rate of dispensing (e.g., from a condition of not dispensing). This can be such that the determination of the rate of dispensing is a determination that dispensing begins. With this, the control component 620 can determine when the cable dispensing apparatus 610 should begin dispensing.

In one embodiment, the cable dispensing apparatus 610 is part of a cable dispensing unit attached to the vehicle. The cable dispensing unit can comprise the cable dispensing apparatus 610 and/or a housing to retain the cable dispensing apparatus as part of the vehicle 210 of FIG. 2. The control component 620 can be part of the cable dispensing unit and/or be physically separate from the cable dispensing apparatus 610.

Figure 7:
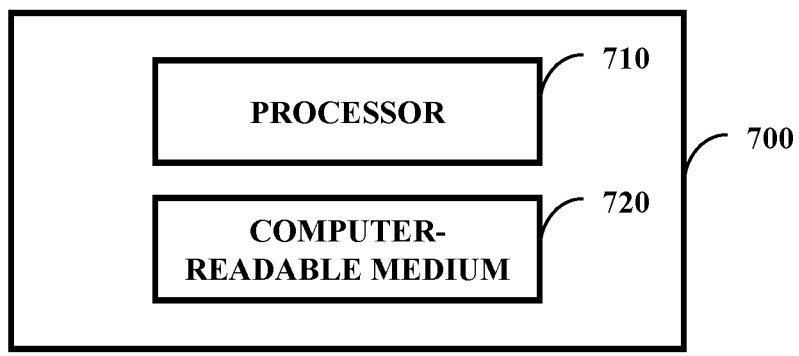
FIG. 7 illustrates one embodiment of a processor and a computer-readable medium.

FIG. 7 illustrates one embodiment of a system 700 comprising a processor 710 (e.g., a general purpose processor or a processor specifically designed for performing functionality disclosed herein, such as a cable dispensing management processor that is part of the cable dispensing apparatus 610 of FIG. 6) and a computer-readable medium 720 (e.g., non-transitory computer-readable medium). In one embodiment, the computer-readable medium 720 is communicatively coupled to the processor 710 (e.g., an integrated circuit) and stores a command set executable by the processor 710 to facilitate operation of at least one component disclosed herein (e.g., the control component of FIG. 6 or the deployment component discussed in FIG. 5). In one embodiment, at least one component disclosed herein (e.g., the determination component 110 of FIG. 1 and/or the operational component 120 of FIG. 1) can be implemented, at least in part, by way of non-software, such as implemented as hardware by way of the system 700. In one embodiment, the computer-readable medium 720 is configured to store processor-executable instructions that when executed by the processor 710 cause the processor 710 to perform a method disclosed herein (e.g., the methods 800-1000 addressed below). The system 800 can, in one example, be at least part of a cable dispensing management component (e.g., that is part of and/or travels upon the vehicle 210 of FIG. 2) that performs at least part of at least one method disclosed herein and resides on the vehicle 210 of FIG. 2.

Figure 8:
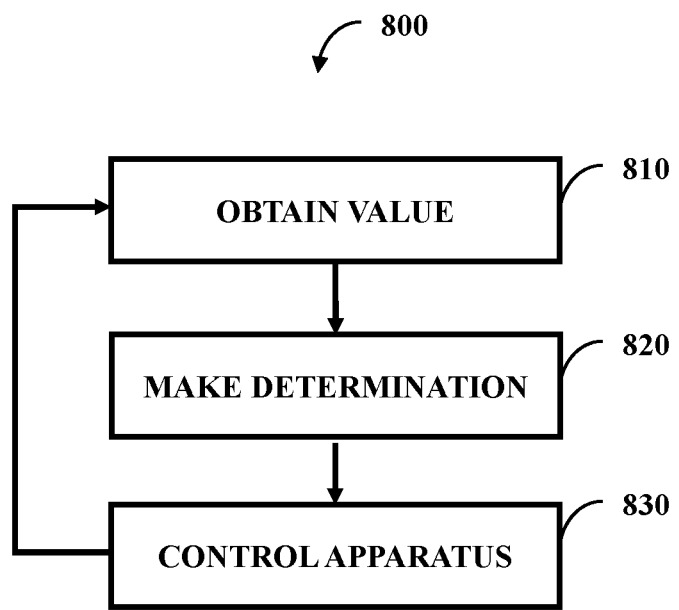
FIG. 8 illustrates one embodiment of a method comprising three actions.

FIG. 8 illustrates one embodiment of a method 800 comprising three actions 810-830. At 810, obtaining a first value (e.g., a first value set) for a travel parameter (e.g., vehicle tilt) of the vehicle 210 of FIG. 2 can occur. This travel condition can be a result of the cable dispensing device travelling on the vehicle 210 of FIG. 2 while the vehicle 210 of FIG. 2 travels. The travel condition can be obtained indirectly for the vehicle 210 of FIG. 2 (e.g., by way of a sensor of the cable dispensing management component) and/or directly from the vehicle 210 of FIG. 2 (e.g., wired communication from the vehicle 210 of FIG. 2 to the cable dispensing management component and not from a sensor). At 820, a determination can be made for a first dispensing rate for a cable dispensing device (e.g., the dispensing apparatus 130 of FIG. 1 and/or the cable dispensing apparatus 610 of FIG. 6) of the vehicle 210 of FIG. 2 based, at least in part, on the first value. At 830, controlling the cable dispensing device to dispense at the first dispensing rate can occur (e.g., while the vehicle 210 of FIG. 2 is in motion). The method 800 can return to 810 where obtaining a second value for the travel parameter (e.g., set of parameters) of the vehicle 210 of FIG. 2 directly from the vehicle 210 of FIG. 2 that is different from the first travel parameter can occur, such as after obtaining the first value. At 820, making a determination for a second dispensing rate for the cable dispensing device based, at least in part, on the second value can occur, such as after making the determination for the first dispensing rate. At 830, controlling the cable dispensing device to dispense at the second dispensing rate can take place (e.g., while the vehicle 210 of FIG. 2 is in motion), such as after controlling the cable dispensing device to dispense at the first dispensing rate.

In one example, the vehicle 210 of FIG. 2 can be a van that is integrated with the cable dispensing device. The travel parameter can be a speed of the van that is the same as a speed of the cable dispensing device in light of the integration. The first value can be higher than the second value, such as shown in FIG. 2 with 30 mph over 15 mph. With this, the first dispensing rate, in FIG. 2 44 fps, can be higher than the second dispensing rate, in FIG. 2 22 fps.

In one embodiment, controlling the cable dispensing device to dispense at the first dispensing rate and controlling the cable dispensing device to dispense at the second dispensing rate can occur with a tension. The tension is a value greater than substantially zero. The tension at the first dispensing rate and the second dispensing rate can be the same or different.

Figure 9:
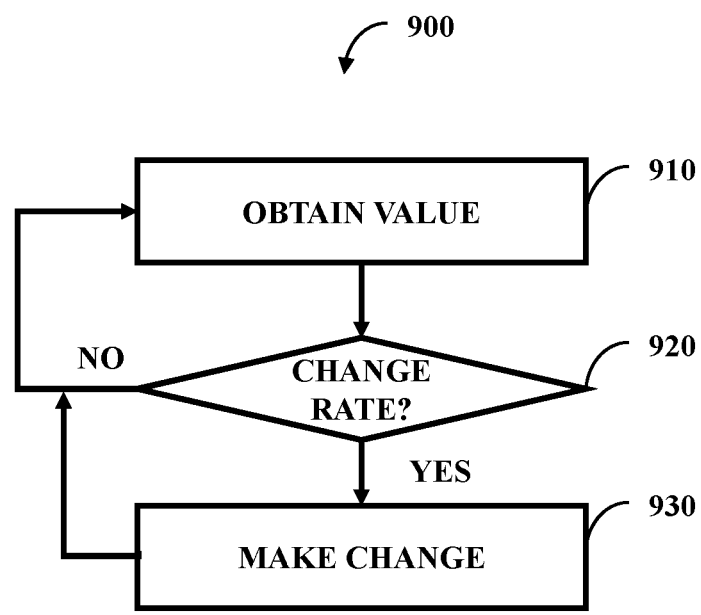
FIG. 9 illustrates one embodiment of a method comprising three actions.

FIG. 9 illustrates one embodiment of a method 900 comprising three actions 910-930. The method 900 can be a determination on if a dispensing rate should be changed. Returning to the example of the previous paragraph, the vehicle 210 of FIG. 2 can travel at 15 mph and this value can be obtained at 910. A check 920 can occur to determine if the rate should change. If not, then the method 900 can return to 910 to again obtain the value (e.g., periodically or once the value changes). If change should occur, then at 930 a change can be identified and made. In one example, the value can change, but the change can be so insignificant that it does not warrant a change in the rate. Therefore, while there is a difference in the value, the rate can remain. While a simple example is discussed, it is to be appreciated by one of ordinary skill in the art that more complex determinations considering multiple factors and value changes can be practiced. One of ordinary skill in the art will also appreciate that aspects disclosed herein, such as those discussed with regard to FIG. 9, can be implemented, in one example, by way of an analog or digital control system.

Figure 10:
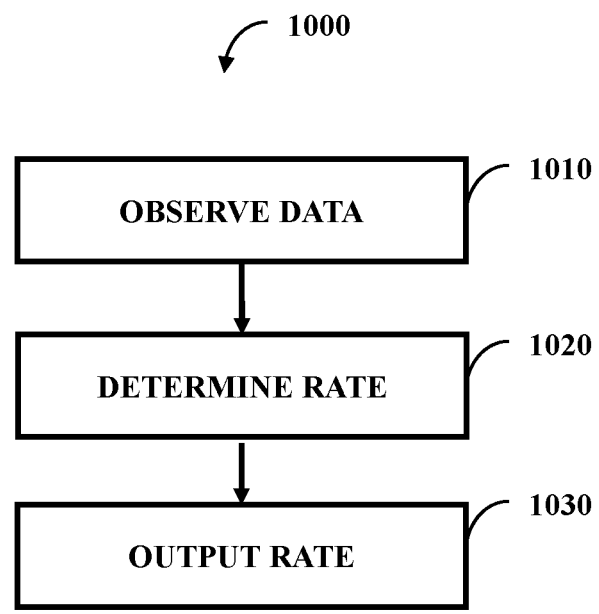
FIG. 10 illustrates one embodiment of a method comprising three actions.

FIG. 10 illustrates one embodiment of a method 1000 comprising three actions 1010-1030. At 1010, data is observed. At 1020, a rate of dispensing is determined based, at least in part, on the data that is observed. At 1030, the rate of dispensing that is observed can be outputted (e.g., sent to a device for use or used to control dispensing).

While aspects disclosed herein have focused on vehicles, aspects disclosed herein can be practiced in a wide range of areas. The following are examples not intended to be exhaustive nor intended to limit applicability of aspects disclosed herein. In one example, aspects disclosed herein can be used in manufacturing. Dispense rates can be modified based on desired or actual worker productivity and/or to achieve just-in-time goals, such as in package wrapping (e.g., where tape is being dispensed). In one example, dispense rates can be modified in the shipping industry for lines used to secure cargo containers. In one example, aspects disclosed herein can be used in the mining industry to lay down power wires or other lines down mine shafts with little light and unknown/uneven terrain. In one example, aspects disclosed herein can be used by emergency crews, such as laying water supply lines or air lines along difficult terrain to a rescued party. With this example, an unmanned vehicle can be used to lay a water line to people trapped beneath rubble where it is too dangerous for manned vehicles to travel.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A non-transitory computer-readable medium communicatively coupled to a processor that stores a command set executable by the processor to facilitate operation of a component set, the component set comprising:
an obtainment component to obtain a travel speed of a vehicle from indirect observation of the vehicle; and
a control component to determine a rate of dispensing from the dispensing apparatus based, at least in part, on a travel characteristic set of the vehicle,
where the travel characteristic set comprises the travel speed of the vehicle,
where the indirect observation of the vehicle is not indirect observation of the dispensing apparatus itself, including an item dispensed by the dispensing apparatus,
where the dispensing apparatus is resident upon the vehicle, and
where the travel characteristic set comprises a terrain upon which the vehicle travels.

2. The computer-readable medium of claim 1,
where the travel characteristic set comprises a predicted direction of the vehicle.

3. The computer-readable medium of claim 1,
where the rate of dispensing is an initial rate of dispensing from not dispensing such that the determination of the rate of dispensing is a determination that dispensing begins and
where the speed of the vehicle is not zero.

4. The computer-readable medium of claim 1,
where the observation component achieves indirect observation of the vehicle through observation of an output of an accelerometer, that is part of the dispensing apparatus, configured to determine the speed of the vehicle.

5. The computer-readable medium of claim 1, the component set comprising:
a calculation component to calculate the travel speed of the vehicle based, at least in part, on a sensor output,
where the observation component achieves the indirect observation of the vehicle through observation of an output of the sensor,
where the sensor is part of the dispensing apparatus, and
where the sensor is configured to observe a wheel rotation over time for a wheel of the vehicle and outputs the wheel rotation over time as the sensor output.

6. The computer-readable medium of claim 1, where the rate of dispensing is a rate of dispending a cable, the component set comprising:
an analysis component configured to identify that a desired length for the cable is achieved; and
a modification component configured to cut the cable in response to identification that the desired length of the cable is achieved.

7. A non-transitory computer-readable medium communicatively coupled to a processor that stores a command set executable by the processor to facilitate operation of a component set, the component set comprising:
an obtainment component to obtain a travel speed of a vehicle from indirect observation of the vehicle; and
a control component to determine a rate of dispensing from the dispensing apparatus based, at least in part, on a travel characteristic set of the vehicle,
where the travel characteristic set comprises the travel speed of the vehicle,
where the indirect observation of the vehicle is not indirect observation of the dispensing apparatus itself, including an item dispensed by the dispensing apparatus,
where the dispensing apparatus is resident upon the vehicle,
where the travel characteristic set of the vehicle comprises a terrain type,
where the terrain type is a type of terrain the vehicle travels upon, and
where the obtainment component is to make an indirect observation of the terrain type.

8. The computer-readable medium of claim 7,
where the obtainment component employs a visual sensor that views the terrain to make the indirect observation of the terrain type.

9. The computer-readable medium of claim 7,
where the obtainment component employs a sensor that monitors shock movement of the vehicle to make the indirect observation of the terrain type.

10. The computer-readable medium of claim 7,
where the obtainment component employs an optical sensor that views tire movement of the vehicle to make the indirect observation of the terrain type.

11. The computer-readable medium of claim 7,
where the rate of dispensing is an initial rate of dispensing from not dispensing such that the determination of the rate of dispensing is a determination that dispensing begins and
where the speed of the vehicle is not zero.

12. The computer-readable medium of claim 7, where the observation component achieves indirect observation of the vehicle through observation of an output of an accelerometer, that is part of the dispensing apparatus, configured to determine the speed of the vehicle.

13. The computer-readable medium of claim 7, where the rate of dispensing is a rate of dispending a cable, the component set comprising:
an analysis component configured to identify that a desired length for the cable is achieved; and
a modification component configured to cut the cable in response to identification that the desired length of the cable is achieved.

14. A system, comprising:
a determination component configured to determine a rate of transfer for a dispensing apparatus based, at least in part, on a predictive motion data set that pertains to the dispensing apparatus;
an operational component configured to cause the dispensing apparatus to dispense at the rate of transfer; and
a deployment component configured to identify a condition on when to deploy a communication device,
where at least part of the determination component is located upon the dispensing apparatus,
where the operational component is configured to cause a communication device to be deployed on response to the condition being identified,
where the dispensing apparatus dispenses a communication cable at the rate of transfer
where a first end of the communication cable is coupled to the communication device,
where the dispensing apparatus begins dispensing the cable when the communication device is caused to be deployed, and
where the determination component, the operational component, the deployment component, or a combination thereof is implemented, at least in part, by way of non-software.

15. The system of claim 14,
where the communication device is a first communication device,
where a second end of the communication cable is coupled to the second communication device, and
where when the cable comes to an end upon a spool of the dispensing apparatus, the second communication device is deployed.

16. The system of claim 14,
where the determination component and the operational component are part of the dispensing apparatus.

17. The system of claim 14,
where the predictive motion data set indicates a predicted direction of the vehicle that is different from a current direction of the vehicle and that results from a turning of the vehicle.

18. The system of claim 14,
where the determination component is configured to determine a rate of transfer for a dispensing apparatus based, at least in part, on the predictive motion data set that pertains to the dispensing apparatus and a terrain traversed by vehicle that retains the dispensing apparatus.

19. The system of claim 14, comprising:
a modification component configured to terminate the transfer by severing a cable dispensed from the dispensing apparatus such that at least part of the cable remains upon the dispensing apparatus.

20. A system, comprising:
a determination component configured to determine a rate of transfer for a dispensing apparatus based, at least in part, on a predictive motion data set that pertains to the dispensing apparatus; and
an operational component configured to cause the dispensing apparatus to dispense at the rate of transfer,
where the predictive motion data set for the dispensing apparatus comprises a direction of the vehicle,
where the dispensing apparatus is located upon a vehicle,
where the dispensing apparatus dispenses cable as the vehicle travels,
where the determination component and the operational component are resident upon a mobile device separate from the vehicle, and
where the determination component, the operational component, or a combination thereof is implemented, at least in part, by way of non-software.

* * * * *